Patented May 16, 1939

2,158,526

UNITED STATES PATENT OFFICE 2,158,526

PARTIALLY HYDROGENATED HETEROCYCLIC NITROGEN COMPOUNDS SUBSTITUTED BY THE ALDEHYDE GROUP AND A PROCESS OF MAKING SAME

Nikolaus Roh, Ludwigshafen-on-the-Rhine, Germany, assignor to General Aniline Works, Inc., New York, N. Y., a corporation of Delaware No Drawing. Application November 20, 1936, Serial No. 111,842. In Germany December 10, 1935

12 Claims. (Cl. 260—289)

The present invention relates to partially hydrogenated heterocyclic nitrogen compounds substituted by the aldehyde group and a process of making same.

It has already been proposed to prepare aldehydes of the indole series by causing heterocyclic nitrogen compounds to react with methylformylaniline in the presence of acid condensing agents containing chlorine. The aldehyde group thus enters the pyrrole nucleus or takes the place of a hydrogen atom of a reactive aliphatic methylene group present in the pyrrole nucleus.

I have now found that partially hydrogenated heterocyclic nitrogen compounds substituted by the aldehyde group in paraposition to the heterocyclic nitrogen atom can be obtained by rearranging under the action of acid condensing agents containing chlorine nitrogen compounds of the general formula

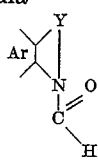

wherein Ar stands for an aryl radicle being free from substituents in the para-position to the nitrogen atom, and wherein Y is a chain of 2 or 3 carbon atoms saturated by hydrogen or alkyl, aralkyl or aryl groups or wherein the carbon atoms of the saturated chain Y are members of a hydrogenated carbocyclic ring system.

The N-formyl compounds of the above general formula may be prepared for example by boiling the corresponding partially hydrogenated N-heterocyclic compounds containing an —NH— group for several hours with formic acid and then distilling off the excess of formic acid. The N-formyl compound of the heterocyclic compound which remains behind is then rearranged under the action of an acid condensing agent containing chlorine as for example phosphorus oxychloride, phosphorpentachloride, oxalylchloride or phosgene, whereby the aldehyde group migrates from the heterocyclic nitrogen atom into the para-position of the aryl radicle.

As suitable starting materials for the present process there may be mentioned for example the following partially hydrogenated heterocyclic nitrogen compounds: 1.2.3.4-tetrahydroquinoline, 1.2.3.4-tetrahydroquinaldine, 2-methylindoline, 2-phenylindoline, 2.2.3.3-tetramethylindoline, 1.2.3.-4.10.11-hexahydrocarbazole and 1.2.3.4-tetrahydro-4-azaphenanthrene. The reaction is preferably carried out in the cold in an organic solvent immiscible with water, such as benzene, ortho-dichlorbenzene or chloroform.

The aldehydes obtainable according to my invention are thus rendered readily available in a simple manner. They are industrially important starting materials for the preparation of dyestuffs and pharmaceutical products.

The following examples will further illustrate how this invention may be carried out in practice but the invention is not restricted to these examples. The parts are by weight.

*Example 1*

155 parts of phosphorus oxychloride are allowed to flow at from 20° to 30° C. while cooling into a solution in 150 parts of benzene of 242 parts of 1-formyl-2-methylindoline having a boiling point of from 145° to 147° C. at 3 millimetres (mercury gauge) which has been prepared by boiling 2-methylindoline for several hours with commercial formic acid and then distilling. After the whole has been stirred for 2 hours, it is allowed to stand for 15 hours; it is then poured while stirring into a mixture of 2000 parts of ice and 1400 parts of 35 per cent caustic soda solution. The benzene and the 2-methylindoline reformed by saponification are expelled by steam distillation. The oily residue is separated from the alkaline solution by taking it up in benzene and the benzene solution is washed and dried. After the benzene has been expelled about 112 parts of the crude aldehyde, already suitable for industrial purposes, are obtained. It boils at from 169° to 170° C. at 2.5 millimetres (mercury gauge) and dissolves in acids giving a yellow-red coloration.

The aldehyde corresponds to the following formula:

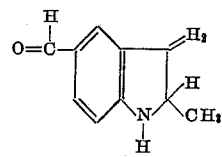

*Example 2*

50 parts of phosphorus oxychloride are allowed to flow at from 20° to 30° C. into a mixture of 25 parts of benzene and 48.3 parts of 1-formyl-1.2.3.4-tetrahydroquinoline having a boiling point of from 180° to 182° C. at 25 millimetres (mercury gauge) which has been prepared by boiling 1.2.3.4-tetrahydroquinoline with commercial formic acid for several hours and then distilling.

After the mixture has been stirred for 3 hours, it is allowed to stand for 15 hours. It is then poured into a mixture of 400 parts of ice and 280 parts of 35 per cent caustic soda solution. The benzene and the tetrahydroquinoline re-formed by saponification are expelled by steam distillation. The residue consists of the crude aldehyde which crystallizes in the cold. After crystallization from benzene it melts at from 95° to 96° C.

The aldehyde corresponds to the formula:—

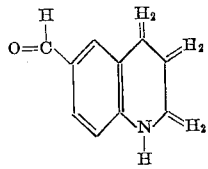

Example 3

50 parts of phosgene are led while cooling into a mixture of 81 parts of 1-formyl-1.2.3.4-tetra-hydroquinoline and 50 parts of benzene, the temperature not being allowed to exceed 25° C. After the reaction mixture has been stirred for 3 hours, it is allowed to stand for about 15 hours and the reaction mass which has become viscous is poured into a mixture of 200 parts of water and 140 parts of 35 per cent caustic soda solution. The benzene and the tetrahydroquinoline which has been re-formed by saponification are expelled by steam distillation. The distillation residue, which crystallizes in the cold, consists of crude 1.2.3.4-tetrahydroquinoline-6-aldehyde and is identical with the reaction product obtained according to Example 2.

If 81 parts of 1-formyl-2-methylindoline be used instead of 81 parts of 1-formyl-1.2.3.4-tetrahydroquinoline, the 2-methyl-indoline-5-aldehyde described in Example 1 is obtained by the same method of working.

Example 4

62 parts of phosphorus oxychloride are slowly added at a temperature below 20° C. to a solution in 80 parts of benzene of 80 parts of 9-formyl-1.2.3.4.10.11-hexahydrocarbazole having a boiling point of from 174° to 176° C. at 1 millimetre (mercury gauge) which has been prepared by boiling 1.2.3.4.10.11-hexahydrocarbazole for several hours with commercial formic acid. After allowing to stand for 15 hours, the reaction mixture is poured into a mixture of 250 parts of ice and 280 parts of 35 per cent caustic soda solution. The benzene and the hexahydrocarbazole re-formed by saponification are expelled by steam distillation. The residue contains the crude aldehyde as a thick viscous oil. The aldehyde boils at from 220° to 230° C. at 1 millimetre (mercury gauge). It corresponds to the following formula:

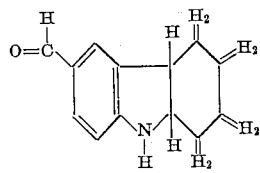

Example 5

64 parts of oxalylchloride are allowed to flow at a temperature below 20° C. while cooling into 81 parts of 1-formyl-1.2.3.4-tetra-hydroquinoline. The reaction passes with the evolution of carbon oxides until finally the reaction mixture solidifies. After allowing to stand for 12 hours the reaction mixture is admixed with water, 120 parts of 30 per cent caustic soda solution are added, and the tetrahydroquinoline re-formed by saponification is expelled by steam distillation. The residue is identical with 1.2.3.4-tetrahydroquinoline-6-aldehyde described in Example 2.

The same compound may also be prepared in the following manner:

104 parts of phosphorpentachloride are added at from 10° to 20° C. to a mixture of 81 parts of 1-formyl-1.2.3.4-tetrahydroquinoline and 150 parts of chloroform while cooling. After about 12 hours' standing the reaction mixture is poured into a mixture of 500 parts of 30 per cent caustic soda solution and 300 parts of ice, and worked up in the manner described above.

Example 6

64 parts of exalylchloride are allowed to flow slowly while stirring into a mixture of 100 parts of ortho-dichlorbenzene and 106 parts of 4-formyl-1.2.3.4 - tetrahydro - 4 - azaphenanthrene (which melts at from 77° to 78° C. and which is prepared by boiling 1.2.3.4-tetrahydro-4-azaphenanthrene with an excess of formic acid for several hours and distilling off the excess of formic acid). After having allowed to stand for about 12 hours, the reaction mixture is poured into water, sodium carbonate being then added until the whole shows an alkaline reaction. The ortho-dichlorbenzene is expelled by steam distillation. The aldehyde formed is purified from the residue by recrystallization with alcohol. It melts at 189° C. and corresponds to the following formula:

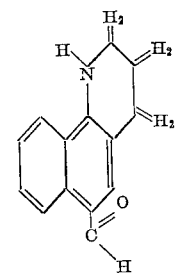

Example 7

52 parts of phosphorus oxychloride are allowed to flow at from 10° to 20° C. into a mixture of 80 parts of benzene and 81 parts of 1-formyl-2-phenylindoline which boils at 220° C. at 12 millimetres (mercury gauge) and which has been prepared by boiling 2-phenylindoline with an excess of formic acid for several hours and distilling off the excess of formic acid. After having allowed to stand for about 12 hours the reaction mixture is poured into water, sodium carbonate being then added until the whole shows an alkaline reaction. The benzene and the 2-phenyl-indoline re-formed by saponification are expelled by steam distillation. The residue consists of the crude aldehyde which forms a yellow, tough resin and decomposes when distilling. The phenylhydrazone obtained from the aldehyde after recrystallization with alcohol melts under decomposition at from 183° to 185° C.

What I claim is:

1. A process for the production of partially hydrogenated heterocyclic nitrogen compounds substituted in an aryl radicle by the aldehyde group in para-position to the nitrogen atom which consists in rearranging under the action of rearranging agents selected from the group consisting of phosphorus chlorides, oxalylchloride and phosgene, heterocyclic nitrogen compounds of the general formula

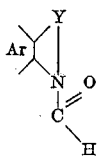

wherein Ar represents an aryl radicle selected from the group consisting of phenyl and naphthyl which is free from a substituent in para-position to the heterocyclic nitrogen atom, and wherein

represents a heterocyclic ring system in which the N-atom shown is the only heteroatom and in which Y stands for a saturated chain of carbon atoms which is condensed with the aryl radicle shown.

2. A process for the production of partially hydrogenated heterocyclic nitrogen compounds substituted in an aryl radicle by the aldehyde group in para-position to the nitrogen atom which consists in rearranging under the action of rearranging agents selected from the group consisting of phosphorus chlorides, oxalylchloride and phosgene in the presence of an organic solvent immiscible with water, heterocyclic nitrogen compounds of the general formula

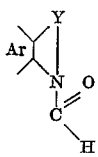

wherein Ar represents an aryl radicle selected from the group consisting of phenyl and naphthyl which is free from a substituent in para-position to the heterocyclic nitrogen atom, and wherein

represents a heterocyclic ring system in which the N-atom shown is the only heteroatom and in which Y stands for a saturated chain of carbon atoms which is condensed with the aryl radicle shown.

3. A process for the production of partially hydrogenated heterocyclic nitrogen compounds substituted in an aryl radicle by the aldehyde group in para-position to the nitrogen atom which consists in rearranging under the action of rearranging agents selected from the group consisting of phosphorus halides, phosgene and oxalylchloride heterocyclyic nitrogen compounds of the general formula

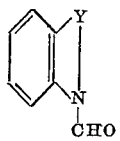

wherein

represents a heterocyclic ring system in which the N-atom shown is the only hetero-atom and in which Y stands for a saturated chain of carbon atoms which is condensed with the phenyl radicle shown.

4. A process for the production of partially hydrogenated heterocyclic nitrogen compounds substituted in an aryl radicle by the aldehyde group in para-position to the nitrogen atom which consists in rearranging under the action of rearranging agents selected from the group consisting of phosphorous halides, phosgene and oxalylchloride an indoline free from substituents in the phenyl nucleus and containing a formyl group attached to the heterocyclic nitrogen atom.

5. A process for the production of partially hydrogenated heterocyclic nitrogen compounds substituted in an aryl radicle by the aldehyde group in para-position to the nitrogen atom which consists in rearranging under the action of rearranging agents selected from the group consisting of phosphorus, phosgene and oxalylchloride 1-formyl-1.2.3.4-tetrahydroquinoline.

6. A process for the production of partially hydrogenated heterocyclic nitrogen compounds substituted in an aryl radicle by the aldehyde group in para-position to the nitrogen atom which consists in rearranging under the action of rearranging agents selected from the group consisting of phosphorus, halides, phosgene and oxalylchloride 9-formyl-1.2.3.4.10.11-hexahydrocarbazole.

7. As new products the partially hydrogenated heterocyclic nitrogen compounds corresponding to the general formula

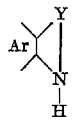

wherein Ar represents an aryl radicle selected from the group consisting of phenyl and naphthyl, substituted in para-position to the heterocyclic nitrogen atom by the aldehyde group, and wherein

represents a heterocyclic ring system in which the N-atom shown is the only hetero-atom and in which Y stands for a saturated chain of carbon atoms which is condensed with the aryl radicle shown.

8. As new products the partially hydrogenated heterocyclic nitrogen compounds corresponding to the general formula

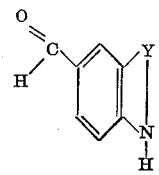

wherein

represents a heterocyclic ring system in which the N-atom shown is the only hetero-atom and in which Y stands for a saturated chain of carbon atoms which is condensed with the phenyl radicle shown.

9. As new products the indolines corresponding to the general formula
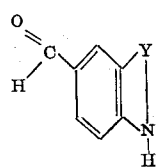
wherein
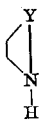
represents a pyrroline radicle which is condensed with the phenyl radicle shown.
10. As a new product the aldehyde corresponding to the formula
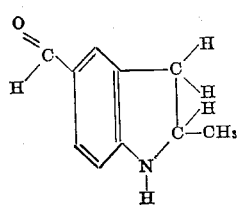
11. As a new product the aldehyde corresponding to the formula
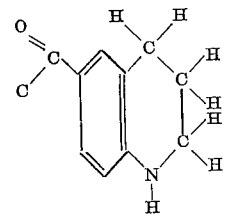
12. As a new product the aldehyde corresponding to the formula
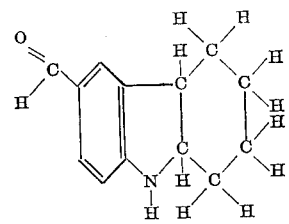
NIKOLAUS ROH.